United States Patent [19]

Frippiat et al.

[11] Patent Number: 5,527,556
[45] Date of Patent: Jun. 18, 1996

[54] COMPOSITIONS HAVING A CREAMY STRUCTURE AND CONTAINING FRUCTAN, PROCESS FOR PREPARING THESE COMPOSITIONS AND THEIR USE

[75] Inventors: Anne Frippiat, Sterrebeek; George S. Smits, Gijzegem-Aalst, both of Belgium

[73] Assignee: Raffinerie Tirlemontoise S.A., Belgium

[21] Appl. No.: 211,519

[22] PCT Filed: Oct. 2, 1992

[86] PCT No.: PCT/BE92/00042

§ 371 Date: Jun. 6, 1994

§ 102(e) Date: Jun. 6, 1994

[87] PCT Pub. No.: WO93/06744

PCT Pub. Date: Apr. 15, 1994

[30] Foreign Application Priority Data

Oct. 4, 1991 [BE] Belgium .................. 9100914

[51] Int. Cl.[6] .................................................. A23L 1/05
[52] U.S. Cl. ..................... 426/573; 426/658; 426/660
[58] Field of Search .......................... 426/658, 660, 426/573

[56] References Cited

U.S. PATENT DOCUMENTS

| | | | |
|---|---|---|---|
| 3,936,391 | 2/1976 | Gabby et al. | 424/73 |
| 4,564,525 | 1/1986 | Mitchell et al. | 426/104 |
| 4,778,680 | 10/1988 | Hidaka et al. | 426/658 |
| 5,169,671 | 12/1992 | Harada et al. | 426/658 |

*Primary Examiner*—Jeanette Hunter
*Attorney, Agent, or Firm*—Hayes, Soloway, Hennessey, Grossman, & Hage

[57] ABSTRACT

Compositions having a creamy structure and containing a fructane or fructanes mixed with a liquid such as water, milk, egg white, egg yolk or sugar syrup; and the use of said compositions in foodstuffs such as ice cream, salad dressings, chocolate preparations, meat products, breads and pastries, fillings, sandwich spreads, jam, dairy products, sauces, etc. The foods containing these compositions are also described.

21 Claims, No Drawings

COMPOSITIONS HAVING A CREAMY STRUCTURE AND CONTAINING FRUCTAN, PROCESS FOR PREPARING THESE COMPOSITIONS AND THEIR USE

OBJECT OF THE INVENTION

The present invention essentially relates to compositions having a creamy structure and containing fructan, to the use of these compositions in food products, such as, for example, ice cream-based desserts, salad dressings, chocolate-flavored preparations, meat products, bakery products, fillings, spreads, confectionery, dairy products, sauces and the like, and to food products containing these compositions.

Technological Background and Prior State of the Art Forming the Basis of the Invention The sedentary lifestyle which we live nowadays in which physical work has practically disappeared, has completely modified the dietary requirements. At present, although less energy-rich food is required, too much lipid, too much salt and not enough food fibers are still being consumed.

Medical science has long ago established a link between an absorption of fats and of excessive amounts of energy and the development of conditions such as obesity, cardiovascular disorders, respiratory disorders and the like. The message saying that "fats are not good for your body" is transmitted to the general public via scientific sources which recommend a healthy diet. The notion which prevails nowadays, namely that "to be beautiful, it is necessary to be slim", has also intensified the demand for low-fat foods (with low content of fats and calories). The replacement of saturated fatty acids with unsaturated fatty acids in fats should reduce the risk of emergence of certain types of cardiovascular disorders, but offers no protection against other disorders and provides no advantage for persons following a slimming diet.

The mere elimination or the reduction of the quantity of fats from prepared meals (for example precooked French fries or croissants for oven baking) has the tendency to give a dry and unappetizing taste to the products, to the extent that this solution cannot be retained for numerous applications.

Consequently, a great need still exists for food compositions capable of finding a place in a diet which is balanced by a partial or even total replacement of fats by a fat substitute offering the taste and physical properties of traditional food compositions. The public today demands foods with low calorific value and low content of fats, but wish them to be as appetizing as traditional foods.

The fat substitutes currently available commercially and at the development stage are based on the use of carbohydrates (such as products based on starch), proteins, esters and ethers. Certain fat substitutes consist of a mixture of compounds of different classes. Doctor H. W. A. Teeuwen, in his article "Fat substitutes: lucrative, but risky" which appeared in International Food Ingredients, 1991, No. 2, p. 4–11, gives a very good survey of the prior state of the art:
Fat substitutes based on carbohydrates.

Colloidal solutions of partially hydrolyzed starches, such as dextrins, maltodextrins and starches hydrolyzed enzymatically, can be envisaged as fat substitutes. Paselli SA2®, produced by AVEBE, a Dutch company, is an example of this group of fat substitutes. Since these creams cannot withstand a prolonged exposure to high temperatures, they are suitable only for foods which are prepared at relatively low temperatures, such as sauces, mayonnaise, spreads and ice cream-based desserts. In most of these applications, the creams cannot replace more than about half of the content of fats without affecting the quality of the product. Unlike other products which are completely absorbed via the digestive tract, polydextrose, a highly branched synthetic D-glucose polymer in which various glucoside bonds intercross, is very difficult to digest. It reasonably withstands normal oven temperatures, but decomposes when it is used for frying, frying thoroughly or roasting. Like creams based on carbohydrates, polydextrose can replace only a portion of the fats in these products, because the replacement of all the fats would result, for example, in a loss of flavor.
Fat substitutes based on proteins ("microparticles of proteins").

Reference is made here to proteins which have undergone a patented heating process followed by a partial coagulation caused by intensive rise in volume (known under the name of "microparticulation"), which disintegrates the proteins into very small globules. The product called Simplesse®, developed by the NutraSweet Co, consists of proteins obtained from egg or skimmed milk albumin. The most serious limitation of Simplesse® is its poor thermal stability.
Fat substitutes based on esters.

The heterogeneous group of esters of this class contains a number of compounds which seem to be potentially ideal as fat substitutes: highly resistant to heat, with very low or even zero energy value, and which are suitable for the replacement of (practically) all the fats in a wide range of foods. Most of these fat substitutes are still at the development stage and the future will tell us if their toxicological and physiological properties prove to be acceptable. Sucrose polyesters (SPE) constitute one example of this class of compound. Olestra®, produced by Procter and Gamble, is the best SPE most widely known. There are, nevertheless, certain disadvantages in the massive use of Olestra®, such as anal losses, the solubility of certain vitamins (A, D, K and especially E), the lack of research which would make it possible to know if microorganisms exist which are capable of decomposing SPEs and the like. Solutions which make it possible to minimize some of these problems have been put forward, but they are still not satisfactory (refer to the article by Doctor Teeuwen, p. 6, right-hand column).
Fat substitutes based on ethers.

The replacement of the ester bonds of a fat molecule by ether bonds makes it possible to obtain a more stable molecule. It is usually more resistant to high temperatures, to enzymatic hydrolysis and to strongly acidic and salty media. Relatively little research has been carried out on ether fats, either in general, or more specifically with respect to their qualities as fat substitutes."

Other disadvantages of certain fat substitutes have [sic] an unpleasant taste and a physical appearance resembling a starch gel more than the oily structure of fats.

Fructans having an average degree of polymerization (DP) equal to or greater than 5, such as, for example, inulin, can also be used as partial substitutes for fats or sugars in certain food preparations, but their functional properties, such as the solubility, have so far considerably limited their range of possible applications. Inulin, for example, has a low solubility compared, for example, with that of sucrose. At 20° C., only about 10% of inulin having an average DP of about 9 can be dissolved in water; at 60° C., it is only possible to obtain aqueous solutions containing 25% inulin.

Moreover, when hot inulin solutions are allowed to cool, inulin precipitates rapidly and a precipitate is obtained at the bottom of the container. This is probably due to retrogradation of the virtually linear molecules of inulin, through which the molecules associate via hydrogen linkages, expelling the water which was present between the molecules.

This retrogradation process is accelerated by each physical action, including a moderate stirring.

Since it is impossible to add to foods concentrated solutions of fructans, such as inulin, they are often mixed with other food ingredients in powdered form. The disadvantage of such a method is that the food products have a taste and a sandy texture. Furthermore, it is often impossible to homogeneously mix the required quantity of inulin with the other food ingredients.

Japanese Patent Application No. 2-81156 describes food products with a low content of calories, containing a composition of fructans of the B-2,1 type with a degree of polymerization of 10 to 100, and having a pasty aqueous structure.

Japanese Patent Application No. 2-81155 describes a process of preparation by a thermal treatment of the above-mentioned composition having a pasty aqueous structure.

There have also been described mixtures of fructans and liquids, having a non-creamy structure and intended for the preparation of immunotherapeutic compositions (WO-A-8, 702,679), of mousses (U.S. Pat. No. 3,809,764) or soluble compositions which make it possible to stabilize colloidal suspensions (WO-A-8,604,091).

Aims of the Invention

The objective of the present invention is to provide a new composition of a fructan or of a mixture of fructans which can be used as food product, or be added to other food products, without reducing the organoleptic qualities of the said food products and without causing a dry sensation in the mouth, white having improved nutritional properties, such as the proliferation of the useful intestinal flora, the reduction of the level of cholesterol in the body and a food fiber effect.

Another aim of the present invention is intended to provide compositions which make it possible to incorporate larger quantities of water into a food product, such as chocolate, or into a preparation intended for the manufacture of such a food product.

Characteristic Features of the Invention

The present invention at present describes compositions having a creamy structure comprising a fructan or a mixture of fructans, mixed in a liquid such as cold or moderately hot water, milk, egg white, egg yolk or sugar syrup, giving rise to the appearance of stable structures (creams) resembling fatty substances which offer new possibilities of applications in products for human or animal consumption, including feed for dogs, cats and the like, as well as in preparations intended for the manufacture of products for human or animal consumption.

In the text which follows, the terms "food composition" and "food product" refer to products intended both for human consumption and as animal feed, including feed for dogs, cats and the like.

Accordingly, the main object of the present invention is to provide compositions having a creamy structure comprising a fructan or a mixture of fructans and a liquid which can be used in food compositions and which overcome most of the disadvantages of the prior state of the art.

Advantageously, the composition according to the invention also comprises a component, preferably a carbohydrate which influences the dissolution and the dispersion of the fructan or of the mixture of fructans and/or reduces the agglomeration of the composition according to the invention during reconstitution after drying the composition.

The invention also relates to the composition according to the invention, dried and comprising this component and/or prepared from dried or codried components.

Preferably, the fructan or a component of the mixture of fructans is inulin or levan which can be unbranched, branched or partially hydrolyzed; the inulin or levan concentration in the composition varying between 5 and 85%.

Advantageously, the inulin contains more than 10% of oligosaccharides with a degree of polymerization of between 2 and 10.

The composition according to the invention is obtained by a preparation process in which a fructan or a mixture of fructans is mixed with a liquid and is subjected to high shear forces.

Another aspect of the invention lies in a process for the incorporation of large quantities of a fructan or of a mixture of fructans into a food product or into a preparation intended for the manufacture of a food product, in which the composition according to the invention is added to the said food product or to the said preparation.

This process, while preserving the appearance, consistency, taste and flavor of the said food product, makes it possible to obtain superior organoleptic properties compared with those of food products to which a fructan or a mixture of fructans has been added in powdered form or as a solution.

The present invention also relates to a new process for the partial or total substitution of fats in a food product or in a preparation intended for the manufacture of a food product in which the fats of the food product or of the preparation are partially or totally replaced by a composition according to the invention; or in which the composition of the invention is formed in situ, by adding the fructan or a mixture of fructans and the liquid to the other food constituents while subjecting the latter to high shear forces.

Another aspect of the invention lies in a process which makes it possible to stabilize the water in a food product, such as chocolate, or in a preparation intended for the manufacture of a food product, by the addition of the composition according to the invention.

In this manner, larger quantities of water can be incorporated into food compositions.

The invention also relates to a food product, such as chocolate, or to a preparation intended for the manufacture of the said food product, optionally with reduced fat or fat-free or comprising a higher percentage of water, characterized in that it comprises, in addition to the usual food components, the composition according to the invention.

The invention relates in particular to a food product or to a preparation intended for the manufacture of a food product, optionally with a reduced fat content, or even fat-free, which possesses an excellent taste and an excellent texture, as well as advantageous nutritional properties, favoring especially the proliferation of the. useful intestinal flora (Bifidobacterium species in particular) and the reduction of the cholesterol level in the body and providing a food fiber effect, while not causing a dry sensation in the mouth, it being possible for this product, in addition, to be easily prepared.

Moreover, the use of the composition according to the invention in foods can give rise to large calorie reductions. With digestible carbohydrates or proteins replacing fats, the calorie reduction is due to the fact that the fats (9 kcal/g) are replaced by a mixture of carbohydrates (4 kcal/g) and water or by a mixture of proteins (4 kcal/g) and water. With fructans, which are not digestible and have a calorific value which is distinctly lower (for example, 1 kcal/g for inulin) than that of proteins and digestible carbohydrates, it is possible to obtain an additional energy reduction.

It is evident that any combination of the composition according to the invention with another fat substitute, with a thickening or gelling agent, with a stabilizer and/or a dispersant, can be used for the preparation of food products with a reduced fat content, or even fat-free.

A final aspect of the invention relates to the use of the composition according to the invention in the form of a food product or a preparation intended for the manufacture of a food product for humans or animals, in the form of a fat or oil substitute or of a carbohydrate substitute or of a stabilizer, or in order to incorporate a larger quantity of water into the said food product or the said preparation.

DETAILED DESCRIPTION OF THE INVENTION

In accordance with the present invention, it has been discovered that a composition having a creamy structure and comprising fructan can be produced by processes which induce a high shear for a fructan or a mixture of fructans and for a liquid, such as water, milk, egg white, egg yolk, sucrose syrup and the like.

The high shear can be obtained by the use of various standard equipment, such as for example mixers, ball mills, high-speed shearing appliances such as an Ultra-Turrax® T25 or a hydroshear, and other similar appliances. The fructan or a mixture of fructans, in the presence of an aqueous medium, can also be subjected to a shearing and a frictional action between the particles by forcing the mixture through a homogenizer or an extruder, and subjecting it to the action of an ultrasound reactor or by heating it according to the preparation process described in Japanese Patent Application No. 2-81155.

The cream compositions are stables they do not give rise to flocculation or separation into two layers, even under a physical action, and they retain their cream texture when they are heated at temperatures at which the fructan or the mixture of fructans is not completely and perfectly solubilized.

The appearance and the consistency of the creamy structure can vary strongly, for example between the appearance and the consistency of a dressing type sauce (very viscous liquid) to the appearance and consistency of margarine or "Nivea® cream" and even up to the harder cold butter form, and this regardless of the physico-chemical structure of the cream (for example of the gel, dispersion or emulsion type, or a combination of these different structures).

In accordance with a preferred embodiment of the present invention, the fructan or a component of the mixture of fructans is inulin, levan, inulin or levan which has been modified by a reaction for rendering branched or unbranched or by a partial hydrolysis.

The inulin used in the present invention is a substance which is easily available, which is of low cost and which can be obtained from Helianthus tuberosus, *Cichorium intybus*, from Dahlia, or from other plants which are widely distributed worldwide. As is generally known, inulin is a polydisperse product of general formula $GF_n$ (G=glucose, F=fructose, n varying from 2 to more than 60).

Inulin therefore naturally contains a large quantity of oligosaccharides with a degree of polymerization of less than 10. Commercial inulin extracted from chicory, for example, contains about 25% of these oligosaccharides, and contains more than 50% of oligosaccharides with a degree of polymerization of 2 to 20.

The time of harvest plays an important role in the composition of inulin. By harvesting the chicory roots towards the end of September or at the beginning of October, an inulin having a high percentage of long-chain GFn is obtained. The later the date of harvest, the shorter the $GF_n$ chains. Moreover, the average length of the inulin chains also varies according to the source from which it is extracted. Furthermore, using separation techniques such as, for example, chromatography, it is possible to separate the short-chain inulin fraction from the longer-chain fraction and therefore to vary the average length of the chains or the average degree of polymerization of the inulin. The average length of the inulin chains is very important since it influences the solubility of the inulin and consequently affects the preparation and the characteristics of the cream.

An unexpected effect of the use of inulin extracted from chicory in the composition according to the invention is that the presence of oligosaccharides which are very soluble in water, with a degree of polymerization of 2 to 10, in large quantities, not only does not prevent the formation of the creamy structure described, but furthermore improves the organoleptic characteristics of the food products containing the said composition (for example a more oily sensation in the mouth).

The great majority of the fructose units of inulin are linked to each other via a $\beta$ 2 1 bond. A detailed analysis has recently revealed that a small percentage (up to 5%) of the constituent units of inulin could be branched. The higher the percentage of branching of the inulin, the more soluble the inulin becomes. Tests have shown that when branched inulin, prepared according to the methods described in International Patent Coapplication WO91/13076 in the name of Raffinerie Tirlemontoise, incorporated in the present patent by way of reference, is used with a percentage of branching of 8%, a considerably higher concentration of inulin is required in the mixture in order to obtain a cream than when inulin is used with only 2% branching. Moreover, a removal of branching from inulin which can, for example, be carried out by reaction with a levan hydrolase, will the preparation of a cream and, consequently, will widen the range of applications of inulin.

In addition, the solubility of inulin can be influenced by adding other substances, such as salts, carbohydrates (for example sucrose), proteins, gums such as xanthan gums, carob gums, guar gums, carboxymethyl-cellulose, carrageenans, alginates, fats, and/or a mixture with each other, to the mixture of inulin and water or milk or egg white or egg yolk or sugar syrup.

In addition, such substances also make it possible to prevent the agglomeration of the particles of the composition according to the invention when it is dried.

Indeed, during the drying of the composition according to the invention, an agglomeration of the particles (probably due to the formation of new hydrogen linkages) takes place; and when the composition is redispersed in a liquid medium, a new energy expenditure is necessary in order to break these hydrogen linkages and reform a composition with a stable and homogeneous creamy structure.

These substances can be added to the composition according to the invention in the form of a dry powder (provided that the composition according to the invention is sufficiently liquid in order to hydrate the substance added to the composition), in the form of a concentrated solution or in the form of an aqueous pasty structure.

As it can be observed in the preceding paragraphs, by modifying all these different parameters which influence the solubility of inulin and, consequently, its capacity to form a cream, a complete range of creams can be prepared having widely variable inulin concentrations, fluctuating from 5 to 85% or more.

Other fructants, such as for example levan, can also be used. Since microbial levan is branched, it may be desirable first to render it unbranched by a reaction with an inulinase.

In accordance with another embodiment of the invention, compositions of fructan creams or containing fructan are used as fat and/or oil substitutes in food products. The replacement of triglycerides with compositions of fructan creams or containing fructan can be made proportionally by an identical quantity of cream compositions as of triglycerides, that is to say on the basis of a "one to one" substitution by weight. Moreover, mixtures of a fructan-containing cream composition with other fat substitutes mentioned above, or with thickening or gelling agents, or with stabilizers or dispersants, can also be used to replace partially or totally the triglycerides in food products. In the case of food compositions in which eggs or emulsifiers containing glycerides are used, small quantities of fats will always be present. In this case, only "virtually fat-free" food products can be obtained.

In accordance with a specific embodiment of the present invention, the fructan used as fat substitute is inulin or modified inulin.

This can be done by adding the inulin-based cream composition to the food products or by producing the cream in situ by applying a high shear to the mixture of the different components which constitute the food product. This latter method can only be applied if the concentration of inulin or of other components of the final food product is sufficiently high to produce a cream. The inulin can be added to the food products in powdered form or in solution but, as mentioned above, these procedures have very serious limitations: the low solubility of inulin does not permit the addition of large quantities of inulin in the form of a solution, whereas the addition of inulin powder, as such, generally modifies the organoleptic properties of the food products obtained (a sandy texture can for example be observed). We have in fact observed that the use of inulin cream in food products offers advantages compared with the mere addition of inulin to foods: a more greasy and more creamy sensation in the mouth, a more smooth and a more oily texture, a more brilliant and more viscous appearance, without unpleasant taste, are obtained. When food products, prepared with inulin cream, were evaluated by a test panel, no dry sensation in the mouth was observed.

It is also very difficult to mix homogeneously large quantities of inulin powder with food preparations. In some cases, for example during the preparation of meat products, it is even impossible to add inulin powder since the latter forms lumps, adheres to the cutter and does not mix with the other ingredients. In all these particular cases, the use of inulin cream offers an ideal solution.

Moreover, by using cream, it is possible to substitute much larger quantities of other products, such as fats or sugars, with inulin such that, not only can foods be produced containing less fats or sugars, but new products free of fats and/or sugars can even be obtained, while preserving the texture, the sensation in the mouth, the taste and the quality of traditional food products.

It has also been observed that the compositions of inulin creams can be effectively and easily used as stabilizers and antisyneresis agents in various food products, emulsions and mousses, especially in dairy products, salad dressings, mousses and the like. In this case, a smaller quantity of inulin is necessary in the form of a cream in order to obtain a stabilizing effect comparable to, or even greater than that obtained with the inulin powder. In yoghourt, for example, prepared with 10% cream containing 50% inulin, the whey does not separate, even after a long period of preservation, whereas the use of 10% powdered inulin can still not prevent the separation of yoghourt into two layers.

Moreover, it has also been observed that the compositions of inulin creams can be used to incorporate water into food products, such as chocolate which can thus contain a higher percentage of water. The chocolate thus produced has a higher melting point and is therefore more suitable for consumption in hot countries. Other compositions, capable of retaining water in a stable form, may also be suitable for the preparation of this type of chocolate.

The use of these compositions of fructan creams and, more specifically, of the compositions of inulin creams, is particularly advantageous from the nutritional point of view since it combines a good food fiber effect and the promotion of the proliferation of the intestinal flora useful for reducing the ingestion of fats and for lowering the cholesterol level in the body.

The following examples, without being limitative, are intended to illustrate the present invention.

EXAMPLE 1

Preparation of Compositions of Inulin Creams in Water

Pour 250 ml of water at room temperature into a beaker and place an Ultra-Turrax® T25 from the firm Jenke & Kunkel Co in the beaker. Add 250 g of inulin with an average DP of 8.7 in small quantities in order to avoid the formation of lumps, while the Ultra-Turrax® is turning at full speed. After the complete addition of the inulin, continue the shearing for 2 to 3 minutes. The cream already begins to form during the operation. The inulin cream is white and opaque and shows a short texture, analogous to that of fats, with pseudoplastic characteristics (it can be easily deformed and thus retains its new shape). It has a thixotropic rheological behavior. The inulin cream is perfectly stable and shows neither deposition nor flocculation.

When the quantities of water and of inulin are changed to 350 ml and 150 g respectively, the Ultra-Turrax® should continue to operate for at least 10 minutes once all the inulin has been added. The cream forms, in this case, only after standing for 2 or 3 hours at room temperature and is of a low hardness. When the beaker is placed in a refrigerator after the shearing, the formation of the cream is accelerated.

When boiling water is used, only the mixture of inulin and water at 50% gives a cream. The mixture of water and inulin at 30% does not form a cream (on the contrary, a deposition and the appearance of two distinct layers is observed), unless the solubility of the inulin is influenced.

Instead of Ultra-Turrax®, other devices which induce a shearing effect, such as a mixer, a homogenizer, an extruder, a hydroshear and the like, can be used.

In general, it can be said that the inulin creams can be formed by shearing in various ways, on the condition that at least a portion of the inulin remains non-solubilized during the operation. The viscosity and the firmness of the inulin creams increase when the inulin content increases. These characteristics are also influenced by the shearing process, by the presence of other components in the mixture, and the like. The effect of these parameters on the hardness of the cream is illustrated in the table below and in Example 4:

TABLE

Hardness of various inulin-water creams

| Inulin concentration (%) | Shearing apparatus | Procedure | Hardness in Newton (N) |
|---|---|---|---|
| 30 | mixer | 22° C., 5 min, maturation in the refrigerator | 0.96 |
| 30 | mixer | 22° C., 5 min, maturation at room temperature | 0.88 |
| 30 | Ultra-Turrax ® | 22° C., 15 min. | 0.85 |
| 30 | homogenizer[2] | 22° C., 200 bars | 2.01 |
| 30 | hydroshear[2] | 22° C., 20 bars | 2.27 |
| 30 | hydroshear[2] | 22° C., 20 bars, 5 min of re-circulation | 3.90 |
| 30[1] | mixer | 22° C., 5 min. | 1.46 |
| 30 | mixer | 22° C., 5 min, pH 3 | 1.24 |
| 30 | mixer | 85° C., 5 min. | 0.04 (not stable) |
| 30 | homogenizer[2] | 56° C., 200 bars | 0.47 |
| 30[1] | mixer | 85° C., 5 min. | 1.34 |
| 50 | mixer | 22° C., 5 min. | 1.35 |
| 50[1] | mixer | 22° C., 5 min. | 1.83 |
| 50 | mixer | 100° C., 5 min. | 3.89 |
| 50 | homogenizer[2] | 50° C., 200 bars | 1.55 |

[1]: The inulin used had an average DP of 10.3. In the other experiments, inulin with an average DP of 8.7 was used.
[2]The homogenizer and the hydroshear were appliances from the firm APV Gaulin.

EXAMPLE 2

Preparation of Other Compositions of Inulin Creams

In the following table, several ingredients capable of being used for the preparation of various compositions or inulin creams have been listed. The procedure used is the same as in Example 1.

| Ingredient A | Ingredient B |
|---|---|
| 50 g of egg white | 50 g of inulin |
| 70 g of egg white | 30 g of inulin |
| 50 g of egg white | 100 g of inulin cream (50% in water) |
| 50 g of skimmed milk | 50 g of inulin |
| 70 g of egg yolk | 30 g of inulin |
| 70 g of sugar syrup (54% d.m.) | 30 g of inulin |

The hardness of the creams prepared from mixtures of 30% inulin in egg white and 30% inulin in skimmed milk, by shearing for 5 minutes by means of a mixer, were 0.91N and 0.81N respectively.

EXAMPLE 3

Preparation of a Cream Composition With Branched Inulin 75 g of branched inulin, in which about 8% of the fructose units are branched, are mixed with 25 ml of water and subjected to shearing for 5 to 10 minutes. A stable cream forms.

EXAMPLE 4

Preparation of a Composition of Inulin Cream in the Presence of Other Carbohydrates Ingredients:
30 g of inulin
20 g of sucrose
50 ml of water The sucrose and the inulin are added to water while mixing. After the addition, the shearing with Ultra-Turrax® is continued for 10 minutes. The cream forms after standing for 30 minutes at room temperature.

The shearing at room temperature of an analogous mixture for 5 minutes with a mixer produces a cream having a hardness of 0.45N. The hardness is lower than in the case of a cream containing 30% inulin without other addition. On the other hand, as it can be seen in Example 6 below, the addition of sucrose improves the heat-stability and also the life of the cream.

EXAMPLE 5

Behavior of Compositions of Inulin Creams During Dilution and/or Acidification

Inulin cream (30% and 50%), as prepared in Example 1, is also obtained by adding inulin to water previously acidified to a pH of 3 by the addition of citric acid.

An inulin cream at 55% is also prepared as in Example 1. 228 g of this cream are then diluted to 30% by adding 278 ml of demineralized water, while mixing. The structure of the cream is maintained.

To another 275 g sample, there is added, with stirring, a solution of citric acid at a pH of 3 in order to obtain a product containing 30% inulin. The structure of the cream, which has a pH of 4.2, is still stable. The further addition of concentrated citric acid in order to reduce the pH of the cream to a value of 3 does not deteriorate the structure of the cream.

In all these experiments, a stable cream structure was obtained and/or maintained.

EXAMPLE 6

Behavior of Compositions of Inulin-Water Creams During a Thermal Treatment

In the following tests, creams of inulin and water are heated at various temperatures in order to determine if the structure of the cream reforms or not during cooling:

| % of dry matter content of the inulin cream | Heating temperature (°C.) | Production of cream during cooling |
|---|---|---|
| 30 (inulin) | 60 | yes |
| 30 | 75 | yes |

-continued

| % of dry matter content of the inulin cream | Heating temperature (°C.) | Production of cream during cooling |
| --- | --- | --- |
| (inulin) 30 | 90 | no |
| (inulin) 30 | 100 | no |
| (inulin) 50 | 100 | yes |
| (inulin) 50 | 95 | yes |
| (30 inulin + 20 sucrose) 75 | 110 | yes |
| (branched inulin) | | |

EXAMPLE 7

Behavior of Compositions of Inulin Creams During Cold Storage

Inulin creams were preserved in a deep freezer for 4 weeks and subjected, in the intervening period, to 5 freeze-thaw (1 day outside the deep freezer) cycles without deterioration of the structure of the cream.

EXAMPLE 8

Fromage Frais

Inulin cream can be used to replace partially or totally the fatty substance (f.s.), and to reduce the cholesterol level, in fromages frais. Since inulin is partially soluble in whey, it should be added after separation of the curd and the whey. At this stage of the manufacture, the use of powdered inulin is no longer possible. The addition of a homogeneous inulin solution is also difficult (because of the low solubility of the inulin) and reduces the viscosity, the firmness, the stability and the dry matter (d.m.) content of the cheese. For all these reasons, the inulin cream offers an ideal technological alternative and makes it possible to obtain a fat-free fromage frais having a more smooth and more oily texture, as well as a more creamy taste (compared with a product without inulin or with inulin used in powdered form).

| Composition (% by weight) | |
| --- | --- |
| Cheese* (0% f.s.–15% d.m. | 85 |
| Inulin cream (50%) | 15 |

*Obtained from skimmed milk, lactic acid bacteria (3%) and rennet (0.005%).

Process

Prepare the inulin cream (50%) in water or skimmed milk (pasteurized) as in Example 1. Pasteurize the skimmed milk in a plate heat exchanger (90° C.-30 seconds) and cool to 25° C. Add the lactic acid bacteria and the rennet and incubate at 25° C. for 20 hours. Separate the curd from the whey (by centrifugation) in order to obtain the desired dry matter content and texture. Add the inulin cream. Mix well and make into a smooth paste. Package, cool and preserve in the refrigerator.

Remark

A better milky taste can be obtained by preparing the inulin cream in milk instead of water.

EXAMPLE 9

Cake

Inulin cream is used to replace, for example, 50% of the fats in a cake recipe. In this case, the replacement of the fats is made proportionally by an identical quantity of inulin cream as of fats replaced. The cake thus obtained has a good taste and a good texture. Inulin cream is preferred in order to obtain a homogeneous paste. During the use of inulin powder, it is indeed difficult to obtain an adequate mixture providing a good structure and the use of an inulin solution in the paste is not possible because it excessively dilutes the paste.

| Composition (% by weight) | |
| --- | --- |
| Flour | 25 |
| Sucrose | 25 |
| Eggs | 24.6 |
| Inulin cream (50%) | 12.5 |
| Margarine | 12.5 |
| Baking powder | 0.4 |

Process

Prepare the inulin cream (50%) as in Example 1. Mix the sucrose, the margarine and the inulin cream. Add the eggs and the baking powder to the mixture, then the flour. Knead the mixture until it is homogeneous. Place the paste in molds and bake at 210° C. for 45 minutes. Package the cake.

EXAMPLE 10

Chocolate Spread

A chocolate spread is obtained from inulin cream and cocoa powder. By using inulin cream, an excellent smooth and oily texture with good spreadability is obtained. The inulin cream can be produced in situ or separately.

| Composition (% by weight) | |
| --- | --- |
| Powdered sugar | 50 |
| Inulin cream (30%) | 35 |
| Cocoa powder | 10 |
| Skimmed milk powder | 5 |

Process

Prepare an inulin cream (30%) as mentioned in Example 1. Add the powdered sugar, the skimmed milk powder and the cocoa powder to the inulin cream and mix vigorously.

Remark

In a comparative experiment, inulin powder was used instead of inulin cream but the chocolate spread thus obtained had a mouth feel and a sandy taste which were completely unacceptable.

EXAMPLE 11

Ice Cream

In ice cream, inulin cream can be used to replace a portion of the fatty substance (for example 50% of the fatty substance in a "Super Premium Ice" type ice cream) or to produce a virtually fat-free ice cream with excellent organoleptic characteristics. The fat-free ice cream of the following recipe has a calorific value of 110 kcal/100 g instead of about 190 kcal/100 g for a conventional ice cream containing 10% of fatty substance, which corresponds to a calorie reduction of more than 40%.

| Composition (% by weight) | |
|---|---|
| Skimmed milk | 59 |
| Inulin cream (50%) | 20 |
| Sugar | 14 |
| Skimmed milk powder | 6 |
| Stabilizer (Grinsted Cremodan SE30) | 0.6 |
| Vanilla flavor (Silesia 111/8309280) | 0.3 |
| Cream flavor (Quest Int. NN 07172) | 0.1 |

Process

Prepare the inulin cream (50%) in water or milk, as in Example 1. Mix the powdered ingredients and disperse this mixture in milk, with stirring. Add the flavorings and the inulin cream. Mix until a homogeneous mixture is obtained. Heat to 80° C. and maintain this temperature for 30 seconds (pasteurization). Homogenize the mixture. Cool to 5° C. and allow to stand for a few hours in the refrigerator (maturation). Aerate (100% overrun) and freeze. Preserve for at least two days in a freezer (hardening).

Remark

Some 10% of an inulin cream (50%) can also be added to sherbets in order to modify their texture characteristics while giving them a more creamy and more oily consistency which is more similar to that of fruit ice creams than to that of conventional sherbets.

EXAMPLE 12

Waffle

A 50% reduction in the fat content is obtained by using inulin cream. The use of the cream also provides a fully homogeneous mixing of the paste. The inulin cream (50%) is used in order to obtain a good temperature resistance during baking.

| Composition (% by weight) | |
|---|---|
| Sucrose | 23.6 |
| Flour | 21.4 |
| Eggs | 21.4 |
| Inulin cream (50%) | 10.7 |
| Shortening | 10.7 |
| Water | 10.7 |
| Soy bean flour | 1.2 |
| Ammonium carbonate | 0.1 |
| Sodium carbonate | 0.1 |
| Lecithin | 0.1 |

Process

Prepare the inulin cream (50%) as mentioned in Example 1). Melt the shortening at 40° C. Add the inulin cream, the sucrose, the eggs and the lecithin. Mix the ingredients in a Hobart type mixer, for a short period. Add the flour, the soy bean flour, the ammonium and sodium carbonates and the water. Beat in a Hobart type mixer for 3 minutes. Place the paste in a waffle iron at 200° C. for 2 minutes. Allow to cool and package.

EXAMPLE 13

Stirred Yoghourt

Inulin cream can be used to replace completely the fatty substances in all types of yoghourt: solid yoghourts, stirred yoghourts and also yoghourt drinks. Yoghourts containing inulin cream offer a more oily sensation in the mouth and a milder taste.

| Composition (% by weight) | |
|---|---|
| Skimmed milk | 75 |
| Inulin cream (40%) | 20 |
| Lactic acid bacteria | 3 |
| Skimmed milk powder | 2 |

Process

Prepare the inulin cream (40%), in water or skimmed milk (pasteurized), as in Example 1. Add the skimmed milk powder to the milk and pasteurize at 90° C. for 15 minutes in a plate heat exchanger. Cool to 45° C., add the inulin cream and lactic acid bacteria. Stir well and incubate in tanks at 45° C. for about 4 hours (up to a pH of 4.5), while stirring. Cool rapidly to 20° C. and package. Cool to 5° C. and preserve at cold temperature.

Remark

The milky and creamy taste can be reinforced by preparing the inulin cream in milk instead of water.

EXAMPLE 14

Salad Dressing

Inulin cream can be used to replace partially or totally the oil in various types of salad dressings. In the composition below, the oil content has been reduced to 15%, while maintaining an excellent texture and taste. Other products having the same taste and mouth feel qualities are obtained with 30% oil and 30% inulin cream (50%), without any addition of starch-based products or of other fat substitutes.

The inulin cream can optionally be prepared in situ during the process of manufacture (colloid mill).

| Composition (% by weight) | |
|---|---|
| Inulin cream (50%) | 35 |
| Water | 25 |
| Corn oil | 15 |
| Vinegar | 9 |
| Egg yolk | 5 |
| Corn starch (Cerestar SF 06301) | 5 |
| Sugar | 3 |
| Salt | 1.5 |
| Mustard | 1.5 |
| Potassium sorbate | 0.03 |

Process

Prepare the inulin cream (50%), as in Example 1. Mix all the powdered ingredients and disperse them in water, with stirring. Continue the mixing while heating at 95° C. Maintain this temperature for 2 minutes. Then, cool immediately to 25° C. Transfer into a Hobart type mixer. Add the mustard and the egg yolk, then the inulin cream and the vinegar, while mixing at low speed. Slowly add the oil and continue mixing for 5 minutes. Subject to the action of a colloid mill, package and preserve at cold temperature.

EXAMPLE 15

Filling for Confectionery and Pastry

A fat-free filling is produced by preparing an inulin cream in situ. The filling can be used for confectionery and pastry products. The filling has a sweet taste and a texture analogous to that of the fatty substance. In this application, the use of inulin powder is difficult for organoleptic reasons: the inulin powder would give a sandy structure.

| Composition (% by weight) | |
| --- | --- |
| Sugar syrup (62% of dry matter) | 79 |
| Inulin | 21 |

Process

Slowly add the inulin to the sugar syrup while stirring. Mix for 20 minutes with an Ultra-Turrax® T25 turning at full speed. The structure of the cream is formed after about 2 hours.

EXAMPLE 16

Chocolate with a Higher Water Content

Chocolate normally contains between 0 and 1% water. By adding more water to the chocolate, it would be possible to obtain a chocolate with a higher melting point. This chocolate would be better adapted to uses in tropical countries and would not melt so quickly in the hand.

Unfortunately, the addition of more water causes an increase in the viscosity of the chocolate paste and the formation of agglomerates. These effects render the use of the paste impossible in applications such as tablets, couverture and the like.

The use of inulin cream makes it possible to stabilize the water, this water being added to the chocolate paste in the form of inulin cream. The chocolate paste, in this case, does not contain agglomerates and has a viscosity permitting its use in tablets, couverture, and the like.

A cream at 50% inulin provides a better stabilization of the water than a cream at 30%.

| Composition (% by weight) | |
| --- | --- |
| Milk chocolate | 95 |
| Inulin cream (50%) | 5 |

Process

Melt the chocolate at 45° C., then cool it to 25° C. Heat the chocolate to 27° C. in order to temper it and to obtain the degree of fluidity necessary for molding. Mix the inulin cream with the tempered chocolate paste. Place the chocolate paste into molds, shake these molds and cool them. Remove the chocolate from the molds and package.

EXAMPLE 17

Plain Spread

Inulin cream can be advantageously used to replace partially the oil and the fat in spreads (of the medium-fat margarine type), with a low fat content. Thus, an excellent spread containing 30% inulin cream (50%) and 20% fatty substance (f.s.), instead of 80% of f.s. in a margarine or 40% of f.s. in a conventional medium-fat margarine, is easily produced without altering either the taste or the texture. The inulin cream can also be produced in situ during the manufacture of the spread, as illustrated in the recipe below.

| Composition (% by weight) | |
| --- | --- |
| Phase A | |
| Butter | 12.50 |
| Mixture of oils | 10.00 |
| Monoglycerides (Orffa type S) | 0.47 |
| Lecithin (Lucas Meyer Metarin P) | 0.20 |
| β-Caroten (Roche — 30% in oil) | 0.03 |
| Phase B | |
| Water | 59.7 |
| Inulin (powder) | 15.0 |
| Gelatin (Sanofi B-I 250 Bl.) | 1.5 |
| Salt | 0.5 |
| Potassium sorbate | 0.1 |
| Lactic acid | q.s. |

Process
Phase A

Premix the powdered ingredients and then incorporate them into the mixture of oils. Add the melted butter and the coloring. Preserve the fatty phase at 55° C.

Phase B

Disperse the gelatin in water at 80° C. Add the other ingredients and adjust the pH to 5 with lactic acid. Mix until a homogeneous mass is obtained. Preserve the aqueous mixture at 55° C.

Spread

Slowly incorporate, and with vigorous stirring, the aqueous phase into the fatty dispersion (55° C.). Homogenize the product at 200 bar and cool rapidly to 12° C. Package in tubs and preserve refrigerated.

EXAMPLE 18

Yoghourt Drink

Inulin cream can be used to replace the fatty substances, but also to stabilize and to reduce effectively syneresis in all types of yoghourt: solid yoghourts, stirred yoghourts and, most especially, yoghourt drinks. Indeed, yoghourts based on inulin cream exhibit no separation of whey during preservation and possess a more oily texture and taste compared with yoghourt drinks prepared without inulin or with powdered inulin.

| Composition (% by weight) | |
| --- | --- |
| Skimmed milk | 68 |
| Inulin cream (33%) | 30 |
| Lactic acid bacteria | 2 |

Process

Prepare the inulin cream (33%) in water or skimmed milk (pasteurized), as mentioned in Example 1.

Pasteurize the milk at 90° C. for 15 minutes over a plate heat exchanger.

Cool to 42° C., add the inulin cream and the lactic acid bacteria. Mix well and incubate, with stirring, in a tank at 42° C. for about 4 h (up to a pH of 4.5). Cool rapidly to 20° C. Stir vigorously and make the yoghourt into a smooth paste (homogenization at 200 bar).

Package, cool to 5° C. and preserve refrigerated.

Comment

The yoghourt drink containing 10% inulin added in the form of a cream (33%) exhibits no separation of whey during preservation, even after one month. In comparison, the same yoghourt without inulin exhibits an obvious separation with 50% whey at the surface and that with 10% powdered inulin still shows 30% whey.

Remark

The milky and creamy taste can be increased by preparing the inulin cream in milk instead of water.

EXAMPLE 19

Liver Pâté

Liver pâté is a typical example of meat products in which inulin cream can be used to replace a portion of the fats, for example 50%, and to reduce the cholesterol level. In the following recipe, we have replaced 30% of fat (lard) with 15% fat and 15% inulin cream (30%), which permits a calorie reduction of more than 35%. Without preparing an inulin cream, it is not possible to add homogeneously such a quantity of inulin to a pâté because the fine inulin powder adheres to the cutter and forms lumps. The inulin cream therefore offers a technological advantage compared with powdered inulin.

| Composition (% by weight) | |
| --- | --- |
| Pork liver | 32 |
| Skimmed milk | 32 |
| Lard | 15 |
| Inulin cream (30%) | 15 |
| Rice flour | 3 |
| Salt | 1.5 |
| Spices | 1.5 |

Process

Prepare the inulin cream (30%), preferably in skimmed milk, as mentioned in Example 1. Poach the lard in water at 90° C. for 10 minutes. Add the ingredients to the cutter in the following order:

liver (trimming), rice flour, salt and spices (sprinkling), lard (trimming), a portion of the milk, the inulin cream, the remainder of the milk.

Mix well and mince until the desired grain fineness is obtained. Cast into terrines and cook in an oven at 90° C. (up to 70° C. at the core of the pate). Cool and preserve at cold temperature.

Remark

In some applications in meat products, the slightly sweet taste of the inulin could be a problem; the residual content of lower sugars (glucose, fructose and sucrose) in the inulin can in this case be reduced by various methods.

EXAMPLE 20

Puff Pastry

In puff pastry, half the margarine used between the sheets can be easily replaced by inulin cream. The structure of the inulin cream facilitates the mixing with margarine. If inulin powder is used in the margarine, only a small quantity of this powder can be mixed and therefore a low degree of fat substitution can be achieved. The use of an inulin solution is also impossible because the quantity of water prevents the formation of a homogeneous mixture with the margarine. The use of cream at 50% inulin is necessary in order to provide a good resistance to heat.

| Composition (% by weight) | |
| --- | --- |
| Flour | 35.5 |
| Water | 14.7 |
| Shortening | 5.1 |
| Sucrose | 4.2 |
| Eggs | 4.2 |
| Yeast | 2.1 |
| Salt | 0.9 |
| Emulsifier | 0.3 |
| Margarine | 16.5 |
| Inulin cream (50%) | 16.5 |

Process

Prepare the inulin cream (50%) as in Example 1. Add the sucrose, the water, the eggs, the yeast, the salt and the emulsifier to the melted shortening. Add the flour and knead the dough for a short period in a Hobart type mixer at low speed. Then mix the inulin cream with the margarine in a Hobart type mixer at low speed, until a homogeneous dough is obtained. Roll out the dough in order to form a sheet, spread the mixture of inulin cream and margarine over the dough and fold the dough into 3×2. Roll out the sheet. Leave the sheet to rest for one hour at 5° C. Fold the sheet again into 3×1. Leave to rest for 60 minutes at 35° C. Give the desired shape to the sheet and bake for 14 minutes at 220° C.

EXAMPLE 21

Pudding

In milk deserts, for example in pudding, inulin cream can be used to replace all the fatty substances and to give a more smooth and more creamy texture.

| Composition (% by weight) | |
| --- | --- |
| Skimmed milk | 60 |
| Inulin cream (50%) | 20 |
| Sugar | 10 |
| Skimmed milk powdeer | 8 |
| Corn starch (Cerestar SF 06304) | 1.7 |
| Carrageenan/guar gum (Sanofi B-I Flanogen RS2) | 0.225 |
| β-Carotene (Univ. Flavors 25142) | 0.050 |
| Vanilla flavor (Sanofi B-I LC9303) | 0.025 |

Process

Prepare the inulin cream (50%), in water or skimmed milk (pasteurized), as in Example 1. Mix all the powdered ingredients and disperse them in the milk, with stirring. Heat to 95° C. and maintain this temperature for 25 minutes. Cool to 70° C. before adding the coloring, the flavoring and the inulin cream, then mix. Package, cool down to 5° C. and preserve at cold temperature.

EXAMPLE 22

Crème Fraîche Chocolate

Chocolates of different tastes are obtained by various additions such as, for example, croquant, nougat, gianduja, milk cream and the like. The minimum concentration of the additions is often 5%. Nevertheless, the addition of milk cream poses technical problems. The cream contains, indeed, about 53% water, which causes an increase in the viscosity and the formation of agglomerates.

The water in the cream can be stabilized by the addition of inulin with vigorous stirring. An inulin cream is thus obtained, in which the water is in a bound form. Tests have shown that a cream at 40% inulin gives the best stabilization. The inulin cream can then be added to the chocolate paste without formation of agglomerates and with a paste viscosity which is compatible with applications such as tablets, couverture and the like.

| Formulation % by weight | |
|---|---|
| Inulin cream (40%) | |
| Crème fraîche (47% d.m.) | 60 |
| Inulin | 40 |
| Chocolate | |
| Milk chocolate | 92 |
| Inulin cream (40%) | 8 |

Process

Prepare the cream (40%) as follows:

Add little by little the inulin to the crème fraîche, with vigorous stirring, for example with a kitchen mixer. Mix until this mixture is homogeneous. Melt the chocolate at 45° C. and then cool it to 25° C. Heat the chocolate to 27° C. in order to tamper it and to obtain the degree of fluidity required for molding. Mix the cream with the tempered chocolate paste. Place the chocolate in molds, shake them and cool them. Remove the chocolate from the molds and wrap it.

EXAMPLE 23

Preparation of an Inulin Cream Using an Ultrasound Reactor

Place 300 ml of water at room temperature in a beaker and place the Undatim Ultrasonics Sonoreactor® in the beaker. Add 200 g of inulin in small quantities or premix with a mixer for 2 minutes, in order to avoid the formation of lumps. The Sonoreactor® is set at a frequency of 20 KHz. The inulin cream already forms in the beaker after 10 minutes, the duration of the reaction being measured from the time when all the inulin has been added.

The inulin cream takes its form and its final consistency after maintaining for 12 hours at room temperature or under colder preservation conditions. If the ultrasound reaction is stopped after 5 minutes, the composition is still in liquid form, but it reaches a stable form by maintaining for 12 hours at room temperature or under colder preservation conditions. The inulin cream prepared by ultrasound has the same appearance as that prepared by the other mixing devices described in Example 1, but the time necessary for the formation of the cream is shorter and the cream obtained is more stable and has a better consistency.

By modifying the quantities of water and inulin to 350 ml and 150 g respectively, the duration of preparation by ultrasound in order to obtain a stable cream after maintaining for 12 hours at room temperature or under colder preservation conditions increases to 15 minutes.

The gel strength values, measured with a Stevens LFRA texture analyzer, for the inulin creams with 30% of dry substance, produced by ultrasound, with a homogenizer at 200 bar, with a hydroshear and with an Ultra-Turrax® are 225 g, 200 g, 150 g and 100 g respectively.

With the Sohoreactor® or any other device based on the application of ultrasound, an inulin cream can be obtained by combining several of these devices according to any combination of frequency and intensity. If the concentration is changed, and therefore the viscosity, the pressure or the temperature, the frequency and the intensity of the process should be consequently adapted in order to obtain an inulin cream with a satisfactory stability and consistency.

In addition to these ultrasound devices, a magnetic stirrer or any other stirrer can be used to obtain a better dispersion of the inulin particles in the medium. In addition, a better, more stable dispersion and a more stable inulin cream should be obtained if an ultrasound device is combined with one or more of the mixing devices described in Example 1.

EXAMPLE 24

Organoleptic Characteristics of the Two Types of Inulin

A cream composition based on inulin extracted from Dahlia tubers (9005-80-5) from Sigma (No. 1-3754 batch 79F7115) containing only GFn chains where n varies from 10 to more than 60, is prepared as in Example 1. The average degree of polymerization of this inulin is equal to 29.

The cream thus obtained has a dry, fibrous and sandy texture and mouth feel which is distinctly less smooth and less oily than in Example 1. The taste is also different: no longer neutral but slightly resembling carton.

The short GFn chains where n varies from 2 to 9, which are present in the inulin used in Example 1, therefore contribute effectively to the oily and creamy texture, as well as to the neutral taste of the inulin creams.

We claim:

1. Composition having a creamy structure and comprising a mixture of inulin and of a liquid, wherein the inulin is a fructan or mixture of fructans and is the essential element of the composition having a creamy structure said creamy structure being stable and resistant to separation into layers upon exposure to physical action or to heat at a temperature at which the fructan or mixture of fructans is not solubilized in said composition.

2. Composition according to claim 1, wherein the liquid is water, milk, egg white, egg yolk or sugar syrup.

3. Composition according to claim 1, wherein the inulin is branched or partially hydrolyzed.

4. Composition according to claim 1, wherein the concentration of inulin in the composition varies from 5 to 85%.

5. Composition according to claim 3, wherein the inulin contains more than 10% oligosaccharides with a degree of polymerization of between 2 and 10.

6. Composition according to claim 1, further comprising a fat substitute, a thickening agent, a gelling agent, a stabilizer and/or a dispersant.

7. Composition according to claim 1, further comprising a component which influences the dissolution and dispersion of the inulin and/or reduces the agglomeration of the composition during reconstruction after drying the composition wherein the component is selected from the group consisting of carbohydrates, salts, proteins, gums, xanthane, carob or sugar gums, carboxymethylcellulose, carrageenans, aliginates, fats or a mixture thereof.

8. Composition according to claim 1, which is prepared from dried or codried components.

9. Composition according to claim 7, which is dried.

10. Process for the preparation of a composition according to claim 1, wherein inulin is mixed with a liquid and is subjected to high shear forces.

11. Process for the incorporation of inulin into a food product or into a preparation intended for the manufacturing of a food product, wherein a composition according to claim 1 is added to said food product or to said preparation.

12. Process for the partial substitution of fats, oils or carbohydrates in a food product or a preparation intended for the manufacturing of a food product, wherein the fats, oils or carbohydrates in the food product or in the preparation are partially or totally replaced by a composition according to claim 1.

13. Process for the partial or total substitution of fats, oils or carbohydrates in a food product or a preparation intended for the manufacturing of a food product, wherein the composition according to claim 1 is formed in situ by adding inulin or liquid to the other food constituents while subjecting them to high shear forces.

14. Process for the incorporation of liquid into a food product or a preparation wherein a composition according to claim 1 is either added to the food during the preparation of said food product or is added to a preparation intended for the manufacturing of the food product.

15. Process according to claim 14, wherein the food product is chocolate.

16. Food product or preparation intended for the manufacturing of a food product, which comprises, in addition to the usual food components, a composition according to claim 1.

17. Food product with a reduced fat level or fat-free or preparation for the manufacturing of said food product, which comprises, in addition to the usual food components, a composition according to claim 1 as partial or total fat substitute.

18. Food product comprising a higher percentage of water or preparation intended for the manufacturing of said food product, which comprises, in addition to the usual components, a composition according to claim 1.

19. Chocolate suitable for consumption in hot countries containing a higher percentage of water and which comprises a composition according to claim 1.

20. Composition according to claim 3, within the inulin contains more than 10% oligosaccharides with a degree of polymerization of between 2 and 10.

21. Composition according to claim 4, within the inulin contains more than 10% oligosaccharides with a degree of polymerization of between 2 and 10.

\* \* \* \* \*